Dec. 19, 1950 W. W. MIEHER 2,534,289
WAVE GUIDE IMPEDANCE MATCHING SECTION
Original Filed Oct. 17, 1942 2 Sheets-Sheet 1
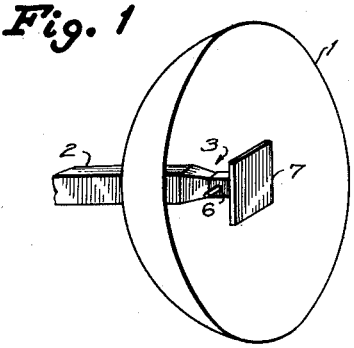
Fig. 1
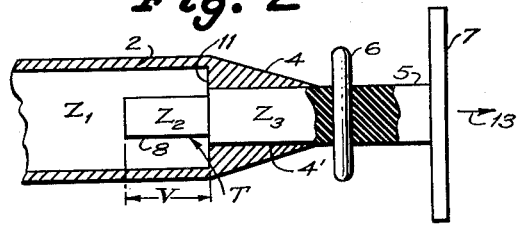
Fig. 2
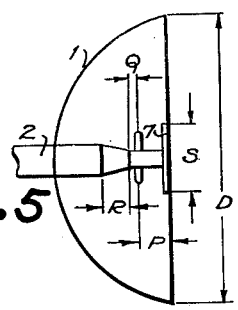
Fig. 5
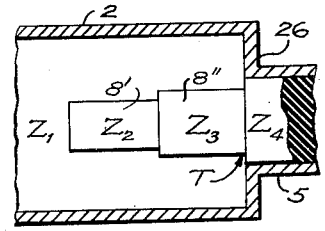
Fig. 8
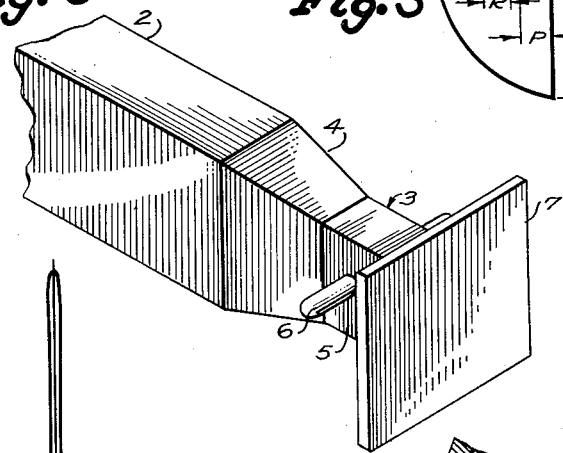
Fig. 3
Fig. 7
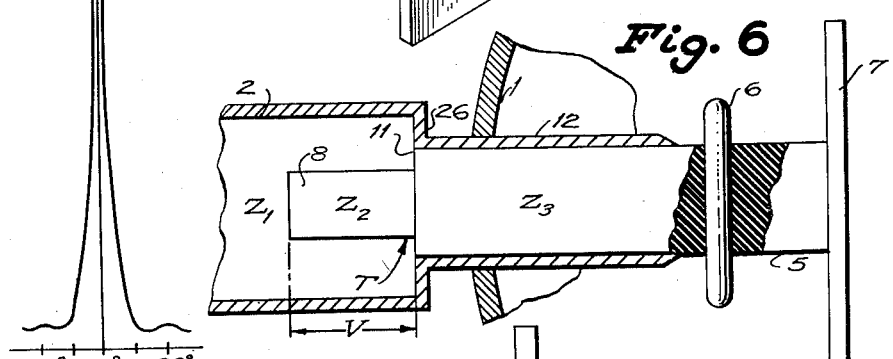
Fig. 6
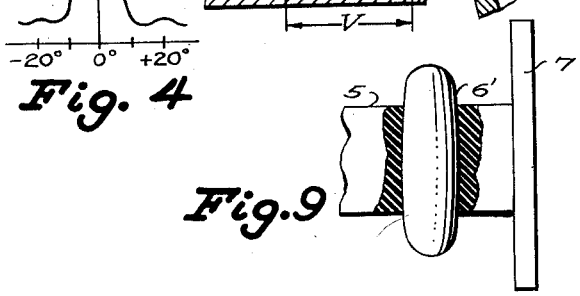
Fig. 4
Fig. 9
INVENTOR
W. W. MIEHER
BY Paul B. Hunter.
ATTORNEY Dec. 19, 1950         W. W. MIEHER         2,534,289
WAVE GUIDE IMPEDANCE MATCHING SECTION
Original Filed Oct. 17, 1942         2 Sheets-Sheet 2
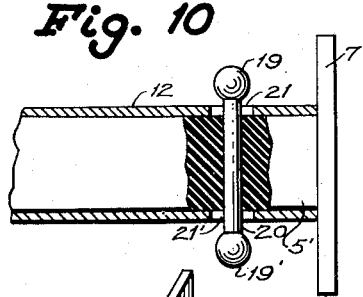
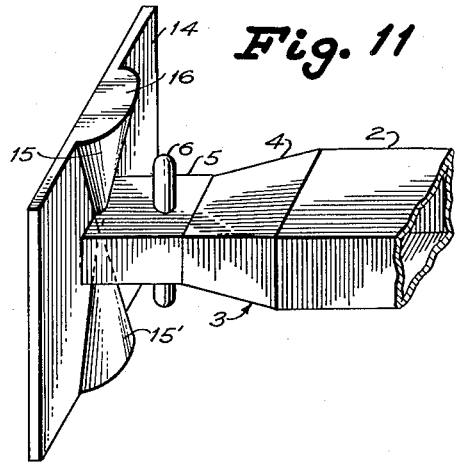
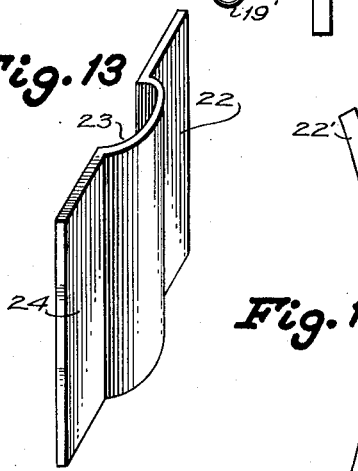
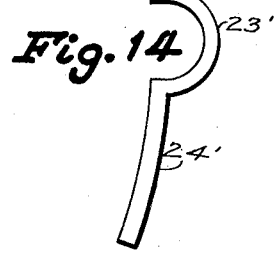
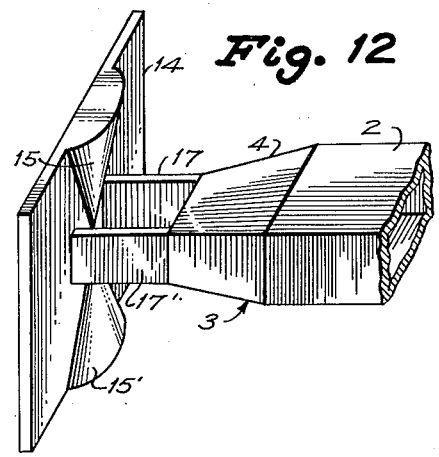
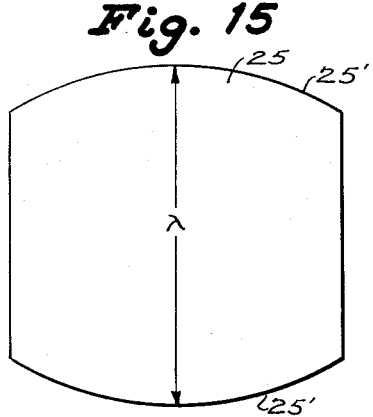
INVENTOR
W. W. MIEHER
BY
Paul B. Hunter
ATTORNEY Patented Dec. 19, 1950

2,534,289

UNITED STATES PATENT OFFICE 2,534,289

WAVE GUIDE IMPEDANCE MATCHING SECTION

Walter W. Mieher, Mineola, N. Y., assignor to The Sperry Corporation, a corporation of Delaware Original application October 17, 1942, Serial No. 462,434. Divided and this application May 28, 1945, Serial No. 596,286

12 Claims. (Cl. 178—44)

This invention relates to electromagnetic energy conductors and, more particularly, to means for minimizing reflections of electromagnetic energy in such conductors.

The present application is a division of Application S. N. 462,434 for Directive Antenna, filed October 17, 1942 and issued as U. S. Patent No. 2,429,640, dated October 28, 1947.

In ultra-high-frequency transmission systems it is frequently necessary to convey in a guided manner electromagnetic energy from one part of the system to another. To this end, dielectric wave guides may be employed, with different portions of the wave guides having different dielectric constants. At the same time, the cross-sectional dimensions of the portions of the wave guides may vary. Under such circumstances, it is advantageous to effect the transfer of energy intermediate such guide portions with minimum reflections of electromagnetic energy. By way of illustration, in connection with a paraboloid it is desirable to employ an electromagnetic energy conductor having relatively small physical dimensions in the vicinity of the antenna structure. Such an arrangement minimizes the obstruction to electromagnetic energy radiated toward the paraboloid.

According to one form of the present invention, a wave guide is provided with a portion containing a solid dielectric, which may be accompanied by a reduction in the cross-sectional area of the solid dielectric portion of the wave guide. Intermediate such solid dielectric portion and the remaining portion of the wave guide, a plurality of matching sections are provided with the sections having characteristic impedances related according to binomial coefficients. In this manner, more effective impedance matching may be achieved, thereby minimizing spurious reflections of electromagnetic energy.

Accordingly, it is an object of the present invention to provide more efficient transmission of electromagnetic energy.

Another object is to provide in connection with dielectric wave guides improved impedance matching means.

A further object lies in the provision of improved means for efficiently coupling wave guide sections having different dielectric constants.

Another object is to provide for the interconnecting of wave guides having different dielectric constants with a minimum of reflected electromagnetic energy.

These and other objects and advantages will become apparent from the specification, taken in connection with the accompanying drawings, wherein the invention is embodied in concrete form.

In the drawings,

Fig. 1 is a perspective view of a paraboloid antenna;

Fig. 2 is a partial cross-section view of a detail of Fig. 1;

Fig. 3 is a perspective view of a detail of Fig. 1;

Fig. 4 is an explanatory graph;

Fig. 5 is a schematic diagram of the reflector and radiator;

Fig. 6 is a partial cross-section view of an alternative form of the device shown in Fig. 2;

Fig. 7 is a cross-section view of an alternative form of a portion of Fig. 6 and illustrates the present invention;

Fig. 8 is an explanatory schematic diagram;

Fig. 9 is a partial cross-section view of an alternative form of a portion of Figs. 2 or 6;

Fig. 10 is a partial cross-section view of an alternative form of the invention;

Figs. 11 and 12 are perspective views of modified forms of the invention; and

Figs. 13, 14 and 15 are alternative forms of details of the invention.

Similar characters of reference are used throughout the figures to indicate corresponding parts.

In Figs. 1, 2 and 3 is illustrated an ultra high frequency paraboloid antenna capable of producing a highly directive beam of radiation, as shown in Fig. 4, with secondary lobes containing a minimum amount of energy. Other shapes of concave electromagnetic wave mirrors or reflectors may be used, e. g., spherical, but for simplicity in description those having surfaces of revolution formed by rotating parabolas and other similar shapes about the axis of symmetry herein will be referred to comprehensively as paraboloids. A paraboloid 1, preferably having its axial dimension substantially equal to its focal length, is irradiated with ultra high frequency energy from an antenna structure 3, which is fed in any orthodox manner from a wave guide or energy-conducting pipe 2. Referring to Figs. 2 and 3, antenna structure 3 is seen to consist of a rectangular hollow wave guide 2 joined to a tapered metallic portion or transition member 4 in which is inserted a dielectric guide 5, in this case shown as a guide formed of material having a relatively high dielectric constant. The dielectric guide 5 and wave guide 2 are provided with discontinuous sections forming an impedance matching transformer T.

The use of a suitable dielectric material, typically a commercially available thermo-plastic composition known as "Polystyrene," permits the critical dimensions of the wave guide 2 to be reduced in the region of the antenna structure, thereby concentrating the beam energy to be radiated by the rod 6 and minimizing obstructions to the wave reflected from the paraboloid 1. Reduction of the cross-sectional dimensions of the guide in the impedance matching section T extending between the wave guide 2 and the radiator 6 also minimizes the obstruction to the energy radiated toward the paraboloid.

Extending into hollow guide 2 is a rectangular extension 8 of dielectric material whose cross-section may be somewhat reduced from that of the main portion of guide 5. The cross-sectional area of portion 8 is adjusted experimentally so that the following relation obtains:

$$Z_1 Z_3 = Z_2^2$$

where $Z_1$ is the characteristic impedance of hollow guide 2, $Z_2$ is that of the section containing dielectric portion 8, and $Z_3$ is that of portion 4' of the dielectric guide 5. The dielectric matching section is adjusted in length V by experiment, its length being substantially a fourth of the average of the wavelengths of the electromagnetic energy within the guides.

It is seen that a series of such steps, as seen at 8', 8'' in Fig. 7, may be used as an impedance transforming means between the guides 2 and 5, in accordance with the principles disclosed in copending application S. N. 592,092, entitled Wave Guide Impedance Transformers, filed May 5, 1945, in the name of Montgomery H. Johnson and William W. Hansen. It is therein shown that if the coefficients of $(x+1)^n$, known as binomial coefficients, are used to describe the increments in the logarithm of the characteristic impedance of successive quarter-wavelength sections of wave guide making up an impedance matching transformer between wave guides of different characteristic impedance, then, as $n$ is increased, the frequency range over which such a wave guide transformer means is useful is increased.

The wave guide 2 and dielectric guide 5, as shown, for instance, in Fig. 7, are joined by shoulder 26 and, more particularly, are constituted of a unitary structure. Thus, it is convenient to speak of the arrangement as a unitary wave guide 2, 5 constituted of a pair of sections, such as dielectric guide 5 and that portion of wave guide 2 which is to the left of the step 8'. This pair of sections, that is, guide 5 and the hollow or air-filled portion of guide 2, which have different dielectric constants and different characteristic impedances, may be conveniently designated in terms of their characteristic impedances $Z_1$, $Z_4$, respectively. The sections $Z_1$, $Z_4$ are joined by a plurality of cascade-connected intermediate sections, which include the steps 8', 8'', which intermediate sections may similarly be identified as $Z_2$, $Z_3$, respectively. As a matter of fact, all of the sections $Z_1$–$Z_4$ are connected in cascade.

Owing to the stepped construction or different cross-sectional area of the dielectric material constituting the steps 8', 8'' in the sections $Z_3$, $Z_4$, respectively, these sections $Z_3$, $Z_4$ are provided with different dielectric constants. It will be noted that the dielectric medium in the sections $Z_3$, $Z_4$ consists of a solid dielectric material, such as steps 8', 8'' and a fluid dielectric material, which is also the same as that present in the section $Z_1$. The composite dielectric material in any of the sections $Z_1$–$Z_4$ may be conveniently termed a core of dielectric material. Such cores of the sections $Z_1$–$Z_4$, when provided with suitable dielectric constants, may provide the sections $Z_1$, $Z_4$ with characteristic impedances related in accordance with binomial coefficients.

The dielectric guide 5 projects on past the end of tapered metallic portion 4, and has transversely extending through such projecting portion adjacent to the principal focus of the paraboloid a round conducting rod or antenna 6, which extends out of the guide equally on each side of the guide. Rod 6 is approximately a half-wavelength long and acts as the chief source of radiation to irradiate the paraboloid reflecting surface. As seen in Fig. 8, rod 6 is excited as shown by the graph 10, so that voltage antinodes appear at its opposite ends. At the end of guide 5 is placed reflector plate or element 7, which is dimensioned so as to act not only to reflect energy toward paraboloid 1, but also, in conjunction with radiating rod 6, to act to cancel out all energy traveling in the direction of the arrow 13 of Fig. 2 directly from rod 6. The diameter of rod 6 is not critical, and as seen at 6' in Fig. 9, is also not critical as to shape, although it preferably is made effectively a half-wavelength long. The length of rod 6 also has been found to be not critical, since excellent results were obtained with a rod whose actual length was slightly in excess of one-half wavelength in free space. In general, shapes of rod 6 having larger diameter have lower loss and are less sharply resonant, thereby having more constant gain over larger frequency ranges.

The preferred geometrical relationship of the parts may be discussed by referring to Fig. 5. In general, reflector element 7 is placed in the plane of the front of the paraboloid, and is made thin-walled and square, of dimensions S about equal to one wavelength. Substantially one quarter-wave P behind reflector or element 7 is placed the half-wave long radiating rod or antenna 6. A very short distance Q further along the dielectric guide 5 begins the substantially quarter-wave long R tapered portion 4, which joins directly to hollow rectangular guide 2. The distance Q is experimentally adjusted to make the distance from rod 6 to the shoulder 11 such that it transforms the impedance looking in the direction of hollow guide 2 into a pure resistance. For example, for a paraboloid of diameter 30 cm., focus 7.5 cm. and a wavelength of substantially 3 cm. and a dielectric guide of substance known commercially as "Polystyrene," the following set of dimensions has yielded good results: dielectric guide 0.62 cm. by 1.45 cm.; S, 2.37 cm. square; P, 0.82 cm.; Q, 0.32 cm.; and R, 0.79 cm., where the antenna 6 is 0.24 cm. in diameter and 1.64 cm. in length. A structure made according to the foregoing provides a highly directive pattern of the general shape shown in Fig. 4, which pattern indicates the results obtained during experimental tests.

In general, however, the length R of tapered portion 4 may be any odd number of quarter-wavelengths and is chosen to be of sufficient taper so as not to cast a shadow on the reflecting surface of paraboloid 1; i. e., so that substantially none of the reflecting surface of paraboloid 1 is hidden from the effective source, at or adjacent to the rod 6. Tapered portion 4 is introduced so that the transformation means between hollow guide 2 and dielectric guide 5 can be located as close as possible to radiating rod 6, whereby dielectric guide 5 is of minimum length, and attenuation is minimized.

The discontinuities in the wave guides may produce undesirable reflections toward the energy source. This difficulty might be overcome by adjusting the distances R and V until reflections from the discontinuity at 11 are neutralized by reflections from the outer end region of the guide 5. Additional slight adjustment may be made by adjusting the dimension Q, or telescoping the entire guide in or out of pipe 2.

If desired, as shown in Fig. 6, tapered portion 4 can be eliminated and the impedance matching transformer T and shoulder 26 formed by the abrupt reduction in dimensions of the casing can be located behind the paraboloid 1, in which case the shoulder cannot produce undesirable radiation. The metallic envelope of hollow guide 2 is decreased in size at point 11 where the matching transformer T begins and extends into the paraboloid 1, the decrease in size of guide 5 being proportional to $$\frac{1}{\sqrt{\epsilon}}$$

where $\epsilon$ is the dielectric constant of the dielectric material. The distance between point 11 and radiating rod 6 is again made such that the impedance seen looking in the direction of hollow guide 2 is purely resistive. It is obvious that the transformer described in Fig. 7 can be substituted for the one shown in Fig. 6 as can any other well-known type of wave guide impedance matching means be substituted in any of the embodiments shown in the drawings.

Fig. 10 discloses a modified form of construction wherein the casing 12 of the dielectric filled wave guide 5' extends to the reflector 7. A modified antenna rod 20 having spherical caps 19, 19', extends through apertures 21, 21' formed in opposite sides of the casing 12, the rod being held in position by the dielectric material. The caps 19, 19' provide some measure of capacitive antenna coupling and permit the use of a shorter antenna rod, thereby reducing the size of the radiator more nearly to a desirable point source of energy.

Figs. 11 through 14 illustrate embodiments wherein use is made of a reflector plate having at least a portion forming a partial surface of revolution about an axis generally parallel to the direction of the lines of electric force within the wave guide 2 and to the axis of radiator 6. Such reflector plates are located with their convex surface facing the paraboloid and may be substituted for the plane plate 7 shown in the preceding views of the drawing.

Figs. 11 and 12 illustrate in perspective antenna structures 3 incorporating such a modified form of reflector plate. In Fig. 11 a preferably flat reflector plate 14 is provided on its reflecting surface with oppositely positioned half conical sections 15, 15' disposed along a common vertical axis with their apices meeting at a common point located on the longitudinal axis of the guide 5. The curved surfaces of the conical sections 15, 15' form an antenna array composed of an infinite number of individual rods extending through the apex and between opposite bases of the conical members. For optimum performance, the distance between bases should be of the order of a multiple of one-half wavelength to increase reflection of energy in the range of operating frequencies, and the surfaces should extend through approximately half a revolution. As will be observed in the drawings, the axis of the conical members 15, 15' extends perpendicularly to the broader sides of the wave guide 2, and to the wave guide axis, and parallel to the electric lines and to the axis of the rod 6. Better results were obtained with a reflector element having a surface curved about a single axis, as described, than were obtained with spherical or other convex surfaces of compound curvature. If desired, the dielectric guide may be dispensed with and, as shown in Fig. 12, two arms 17, 17' of dielectric material may be used to support the plate 14.

Figs. 13 and 14 illustrate reflectors which likewise curve about an axis in a single plane, e. g., vertical, for use with the guide 2 positioned as shown in Fig. 11. In Fig. 13, the reflector plate comprises a metal member 22 having coplanar end portions 24 and an intermediate convex portion 23 preferably comprising a half section of a cylinder, the diameter of which is of the order of the width of the wave guide 2. The reflector 22' shown in Fig. 14 differs from that shown in Fig. 13 in that the coplanar portions 24 are replaced by convex surface portions 24' having a larger radius of curvature about a vertical axis than portion 23. It appears that reflectors with surfaces having simple curvatures, e. g., revolved about a single axis, of the type shown in Figs. 11 through 14, disperse the energy over a wider area of the paraboloid than plane reflectors, and that they operate in a manner superior to surfaces having compound curvatures. The shape of the plate 22 may be roughly square, with edges of the order of a multiple of one-half wavelength. In use, the plates are positioned with their convex sides facing the paraboloid.

In Fig. 15, a reflector plate 25 comprises a plane plate having top and bottom edges 25' that approach one another from a maximum separation distance equivalent to a wavelength or other multiple of half wavelengths. The plate 25 therefore comprises an antenna array formed of an infinite number of vertical rods having natural oscillation frequencies in the operating range. The central portion resonates with the principal frequency used in the system and successively adjoining portions have natural frequencies that are higher as the distance between the opposite edges 25' decreases. As shown in Fig. 15, the edges 25' may have a shape determined by a radius of curvature equal to the maximum separation distance, e. g., one wavelength, and swinging about a median line.

It is apparent that many changes could be made in the above construction and many apparently widely different embodiments of this invention could be made without departing from the scope thereof. It is evident to one skilled in the art that components herein disclosed could be interchangeably used. Accordingly it is intended that all matter contained in the above description or shown in the accompanying drawings shall be interpreted as illustrative and not in a limiting sense.

What is claimed is:

1. High frequency apparatus comprising a wave guide having two sections of differing cross-sectional area, the smaller of said sections being filled with dielectric material different from air, and means for matching the impedances of said sections comprising an extension of said dielectric material extending into said larger wave guide wherein said extension comprises a plurality of dielectric material sections of differing cross-section, the cross-sections of said dielectric material sections being chosen to provide wave guide sections having characteristic impedances related in accordance with binomial coefficients, each of said sections being substantially one-quarter wavelength long at the average operating frequency of said apparatus.

2. High frequency apparatus comprising a wave guide having two sections, each of said sections having a different dielectric constant, and means for matching the impedances of said sections, said matching means including a plurality of cascade-connected intermediate sections interposed between said two sections, said intermediate sections having different dielectric constants, said dielectric constants providing said sections with characteristic impedances related in accordance with binomial coefficients.

3. High frequency apparatus comprising first and second wave guide sections having dielectric material therein, and two further wave guide sections connected between said first and second sections, all of said sections being connected in cascade, said further sections having dielectric material therein, the dielectric constants of said sections providing characteristic impedances related according to binomial coefficients.

4. Apparatus as in claim 3 wherein said further sections are each substantially one-quarter wavelength long at the average operating frequency.

5. High frequency apparatus comprising a wave guide having a pair of sections, at least one of said pair of sections having a solid dielectric material therein, and a plurality of further sections connected between said pair of sections, said further sections having solid dielectric material therein, the dielectric constants of all of said sections providing characteristic impedances related according to binomial coefficients.

6. High frequency apparatus comprising first and second wave guide sections, one of said sections being filled with dielectric material differing from air, a pair of further juxtaposed wave guide sections connected in cascade with said first and second sections, said further sections being partly filled with dielectric material differing from air, the cross-sections of said dielectric material of said further sections providing said further sections with characteristic impedances related in accordance with binomial coefficients.

7. Apparatus as in claim 6 wherein each of said pair of further sections is substantially one quarter wavelength long at the average operating frequency.

8. A high frequency impedance transforming member for connecting together without reflection two wave guides, said member and said guides being constituted of a metallic sheath, one of said guides having a core of solid dielectric material, the other of said guides having a core of dielectric material which has a dielectric constant different from that of said core in said one guide, said member being constituted of a plurality of substantially one-quarter wavelength long sections, each of said sections having a core of dielectric material, the dielectric constants of said cores of said guides and said sections in part providing said guides and said sections with characteristic impedances related in accordance with binomial coefficients.

9. Apparatus as defined in claim 8 wherein one of said cores of said sections comprises a solid dielectric material and a fluid dielectric material.

10. Apparatus as defined in claim 8 wherein one of said cores of said sections comprises a plurality of dielectric material which differ in dielectric constants.

11. High frequency apparatus comprising a wave guide having two sections of differing cross-sectional area, the smaller of said sections being filled with a solid dielectric material, and means for matching the impedances of said aforementioned sections including intermediate sections formed in part of an extension of said dielectric material projecting into said larger wave guide section, the cross-sectional area of said extension being different in each of said intermediate sections, whereby each of said intermediate sections possess different impedance characteristics, the characteristic impedances of all said sections being related in accordance with binomial coefficients.

12. Apparatus as in claim 11 wherein each of said intermediate sections is substantially one-quarter wavelength long at the average operating frequency of said apparatus.

WALTER W. MIEHER.

REFERENCES CITED

The following references are of record in the file of this patent:

UNITED STATES PATENTS

| Number | Name | Date |
|---|---|---|
| 2,197,122 | Bowen | Apr. 16, 1940 |
| 2,206,923 | Southworth | July 9, 1940 |
| 2,207,845 | Wolff | July 16, 1940 |
| 2,370,053 | Lindenblad | Feb. 20, 1945 |
| 2,376,785 | Krasik | May 22, 1945 |
| 2,411,534 | Fox | Nov. 26, 1946 |